Figure 3:
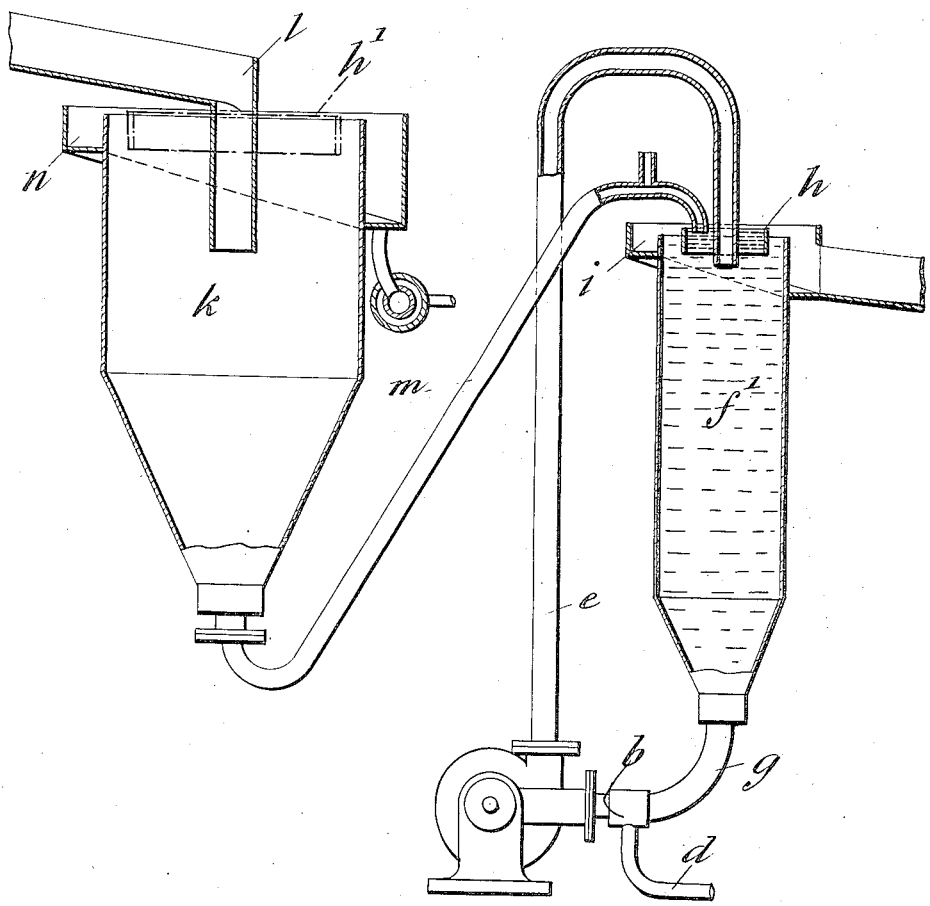

No. 865,334. PATENTED SEPT. 3, 1907.
A. S. ELMORE.
APPARATUS FOR CONCENTRATING ORES.
APPLICATION FILED DEC. 11, 1903.
2 SHEETS—SHEET 1.
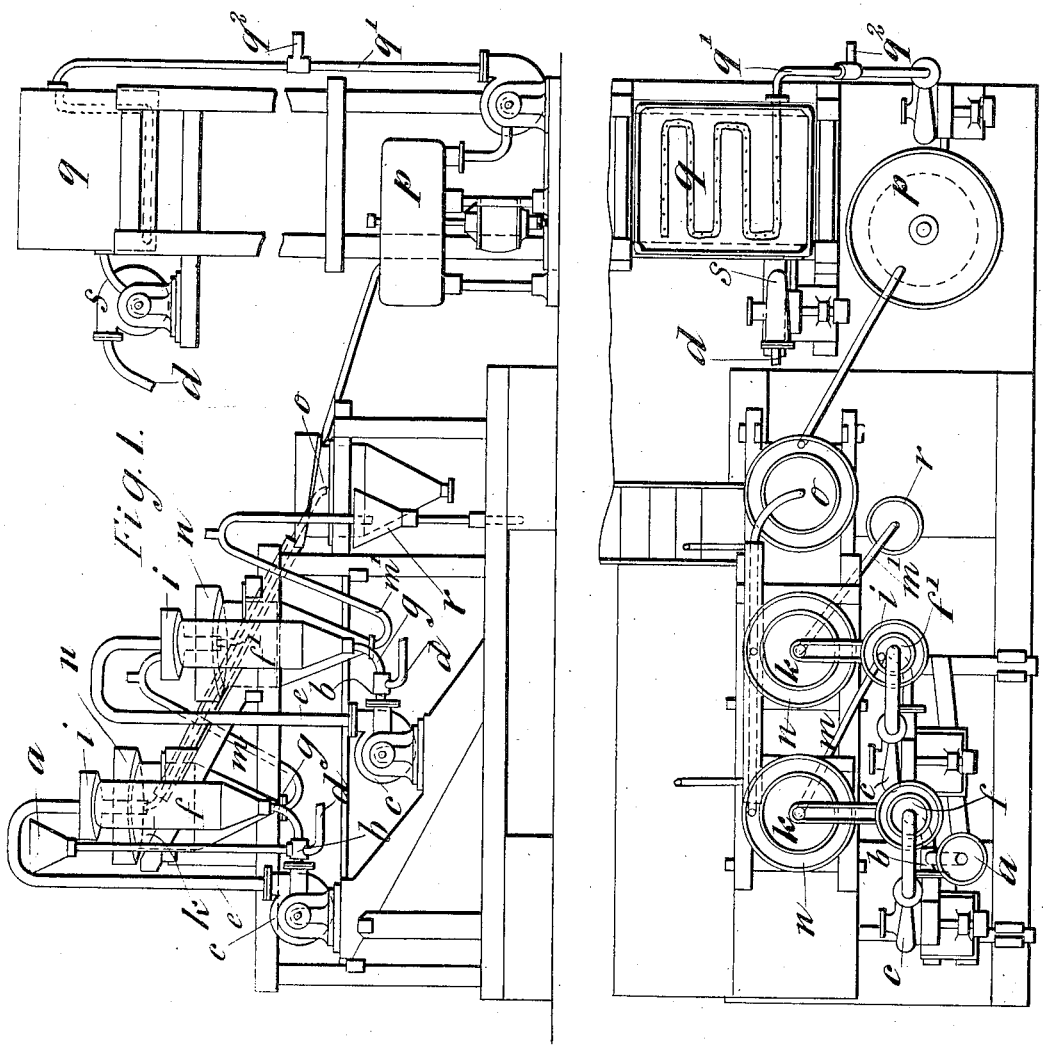
Witnesses.
James ... Norris Jr.
Robert Everett.
Inventor,
Alexander Stanley Elmore.
By James L. Norris
Atty.

UNITED STATES PATENT OFFICE.

ALEXANDER STANLEY ELMORE, OF LONDON, ENGLAND, ASSIGNOR TO THE ORE CONCENTRATION COMPANY (1905) LIMITED, OF LONDON, ENGLAND.

APPARATUS FOR CONCENTRATING ORES.

No. 865,334.　　　　　Specification of Letters Patent.　　　　　Patented Sept. 3, 1907.

Application filed December 11, 1903. Serial No. 184,817.

*To all whom it may concern:*

Be it known that I, ALEXANDER STANLEY ELMORE, a subject of the King of Great Britain and Ireland, residing at 4 Bishopsgate Street Within, in the city of London, England, have invented certain new and useful Improvements in Concentrating Ores and Apparatus Therefor, of which the following is a specification, (for which I have applied for a patent in Great Britain, dated January 3, 1903, No. 184.)

It has been found that when pulverized ores mixed with a considerable quantity of water are further mixed with heavy oil or like substance, the metallic particles are taken up by the oil and can be decanted with it leaving the rocky and earthy ingredients of the ore to pass away with the water, I have found that oxidizable ores such as tellurid ores can be concentrated in like manner the particles containing the tellurium or other metal being taken up with the oil, but there is considerable risk of oxidation unless precautions are taken to prevent access of air to the ore during treatment. I therefore deal with such oxidizable ores in the following manner. I finely pulverize the ore that is to be treated and mix at the time of pulverizing or subsequently with water enough to bring it to the condition of pulp and I cause the pulp to circulate through a rotary pump and a vessel in which the pump is mounted or with which it is connected. To the current of pulp as it passes to the pump I admit the oil or like substance which becomes thoroughly mixed with the pulp by the action of the pump. The vessel through which the mixture of pulp and oil circulates has overflow outlets at the top, these being shielded by partitions that dip into the liquid. Thus there is maintained over the mixed liquid in the vessel a floating layer consisting mostly of oil and the metallic ingredients and preventing the access of air to, and oxidation of the ingredients of the fluid below it. The mixed liquid that overflows from the vessel is conducted to settling receptacles from which the oil carrying the metallic particles flows away or is decanted at the top, while the water carrying the earthy and rocky particles flows away at the bottom. The oil is then separated from the metallic particles by centrifugal action or by a filter press and may be used again for treating fresh quantities of ore or slime, but however the separation is effected I prefer to heat the oil, or to thin it down by adding some volatile solvent which may be recovered by distillation, I may wash the cakes in the filter press with a solvent, or with steam or hot water. In all cases where the oil is thinned by heat for facilitating the extraction of mineral it is to be cooled down to about the temperature of the pulp before being used again, preferably by blowing cold air through the oil.

The accompanying drawings in which Figure 1 is an elevation, Fig. 2 a plan and Fig. 3 a part vertical longitudinal section on an enlarged scale, illustrate diagrammatically an arrangement of apparatus adapted for the treatment of ores by this process.

The sludge of ore and water is fed through the hopper $a$ to the suction pipe $b$ of a suitably driven centrifugal pump $c$ to which is also admitted by the pipe $d$ a supply of a heavy oil or like substance. The delivery pipe $e$ of the pump leads to the top of a mixing tank $f$ the bottom of which is connected by a pipe $g$ to the suction pipe of the pump. The pump $c$ maintains an active circulation of the mixed ore water and oil in the tank $f$ and as soon as the latter is full, a layer of oil collects on the top above the mouth of the delivery pipe and is there retained by the ring $h$. A mixture of ore, water and oil overflows under the ring $h$ and over the edge of the tank into a gutter $i$ surrounding the latter and from there is carried into a subsiding tank $k$ by the dip pipe $l$. The earthy and rocky matter settles with the water in the bottom of the tank and the oil carrying the mineral matter rises to the top. An outlet pipe $m$ leads from the bottom of the subsiding tank to the mouth of the mixing tank $f'$ of a second set, into which the tailings from the bottom of the subsiding tank $k$ are continuously delivered, where they are again mixed with a fresh supply of oil and the treatment is repeated. In a similar manner the tailings from the second set may be delivered to a third set and the process again repeated. A pipe $m'$ leads from the bottom of the subsiding tank of the last set to a hopper $r$ which delivers the tailings to any suitable transporter. When the mineral charged oil in the subsiding tank rises to the top of the tank which is arranged to be at the same level as the overflow of the tailings, it overflows into a gutter $n$ surrounding the tank and passes by a steam jacketed launder to a store tank $o$ and thence to a centrifugal machine $p$. The oil is there separated from the mineral and is then pumped into a storage tank $q$ and cooled by forcing cold air through the oil before being again used. The cooling may conveniently be done by providing the delivery tube $q'$ with one or more air inlet branches $q^2$ through which cold air is aspirated by the upward current of oil. The cooled oil is then transferred as required by the pump $s$ through pipe $d$ to the mixing tank $f$ of the first set. A sealing ring for retaining a film of oil on the surface, such as is used in the mixing tank, may also be used in the subsiding tank as shown in dotted lines at $h'$ in Fig. 3.

It will be understood that instead of using a rotary pump for the purpose of agitating the mixture of ore water and oil, any equivalent device for subdividing the oil and securing intimate contact between it and the particles of mineral matter may be used instead.

Neither is the invention limited to the treatment of oxidizable ores, as it is also applicable to other ores.

Having thus described the nature of my said invention and the best means I know of carrying the same into practical effect, I claim:

Apparatus for the treatment of ores with oil, comprising a mixing tank, a mixing device for intimately mixing a pulp of the ore with oil in the mixing tank, and a floating seal of oil inclosed by a ring for excluding air from the said tank during the mixing process, substantially as described.

In testimony whereof I have signed my name to this specification in the presence of two subscribing witnesses.

ALEXANDER STANLEY ELMORE.

Witnesses:
DAN. P. KINGSFORD,
J. R. WILSON.